Inventors
Donald R. Vissers
Martin J. Steindler
John T. Holmes

Attorney

United States Patent Office 3,491,513
Patented Jan. 27, 1970

3,491,513
TELLURIUM HEXAFLUORIDE REMOVAL METHOD
Donald R. Vissers, Naperville, Martin J. Steindler, Park Forest, and John T. Holmes, Downsers Grove, Ill., assignors to the United States of America as represented by the United States Atomic Energy Commission
Filed Oct. 22, 1968, Ser. No. 769,658
Int. Cl. B01d 53/12
U.S. Cl. 55—71                                                 5 Claims

ABSTRACT OF THE DISCLOSURE

Tellurium hexafluoride and fluorine are removed from a gas by passing the gas through a fluidized bed of activated alumina to remove the greater portion of fluorine and thereafter passing the effluent from the fluidized bed through a packed bed of activated alumina to remove the tellurium hexafluoride.

CONTRACTUAL ORIGIN OF THE INVENTION

The invention described herein was made in the course of, or under, a contract with the United States Atomic Energy Commission.

BACKGROUND OF THE INVENTION

A continuous fluoride volatility process is under development at the Argonne National Laboratory to separate uranium and plutonium from spent nuclear fuel elements. During the process in which fuel elements are oxidized and later fluorinated to produce volatile fluorides, tellurium hexafluoride as well as other fission product fluorides must be separated for storage and eventual disposal. Because the gas stream which contains the tellurium hexafluoride will also contain large amounts of elemental fluorine, systems designed to eliminate the tellurium hexafluoride must also be able to handle the fluorine present.

Wasted disposal and storage are two problems which confront the designers of nuclear fuel reprocessing plants. While moderately large volumes of liquid waste can be tolerated for the present because there are relatively few nuclear reactors operating in the United States, a better solution must be found in order to accommodate the much greater volumes of waste which will result from the operation of the next generation of nuclear reactors. To that end sorption of fission product gases or other radioactive gases onto solids which have a relatively small volume and are easily stored for long periods of time is one answer to the waste disposal problem.

SUMMARY OF THE INVENTION

This invention comprises removing tellurium hexafluoride from a gas containing tellurium hexafluoride by passing the gas through a packed bed of activated alumina, and if the gas also contains elemental fluorine, then the gas is passed through a fluidized bed of activated alumina before it is passed through the packed bed.

DESCRIPTION OF PREFERRED EMBODIMENT

Activated alumina is porous aluminum oxide monohydrate having a high surface area. A number of experiments were conducted to determine the effects of four variables on the removal of tellurium hexafluoride from air streams by a packed bed of activated alumina. The independent variables were bed temperature, bed height, gas velocity and tellurium hexafluoride concentration, while the dependent variables were tellurium hexafluoride loading on the activated alumina and the tellurium hexafluoride decontamination factor. The decontamination factor, hereinafter DF, is the ratio of tellurium hexafluoride concentration entering the bed to the tellurium hexafluoride concentration leaving the bed. Each independent variable was studied at two levels as shown in Table I where the variables are presented as (+) and (−) for the high and low levels respectively.

TABLE I

| Experiment | Level of variable | | | |
|---|---|---|---|---|
| | Temp. | Gas velocity | Bed height | $TeF_6$ concentration |
| 1 | − (25° C.) | − (20 ft./min.) | + (2 in.) | + (500 p.p.m.) |
| 2 | − | + (40 ft./min.) | − (1 in.) | + |
| 3 | + (100° C.) | + | + | + |
| 4 | + | − | − | + |
| 5 | − | + | + | − (250 p.p.m.) |
| 6 | − | − | − | − |
| 7 | + | − | + | − |
| 8 | + | + | − | − |
| 9 | − | − | + | + |

Figure 1:
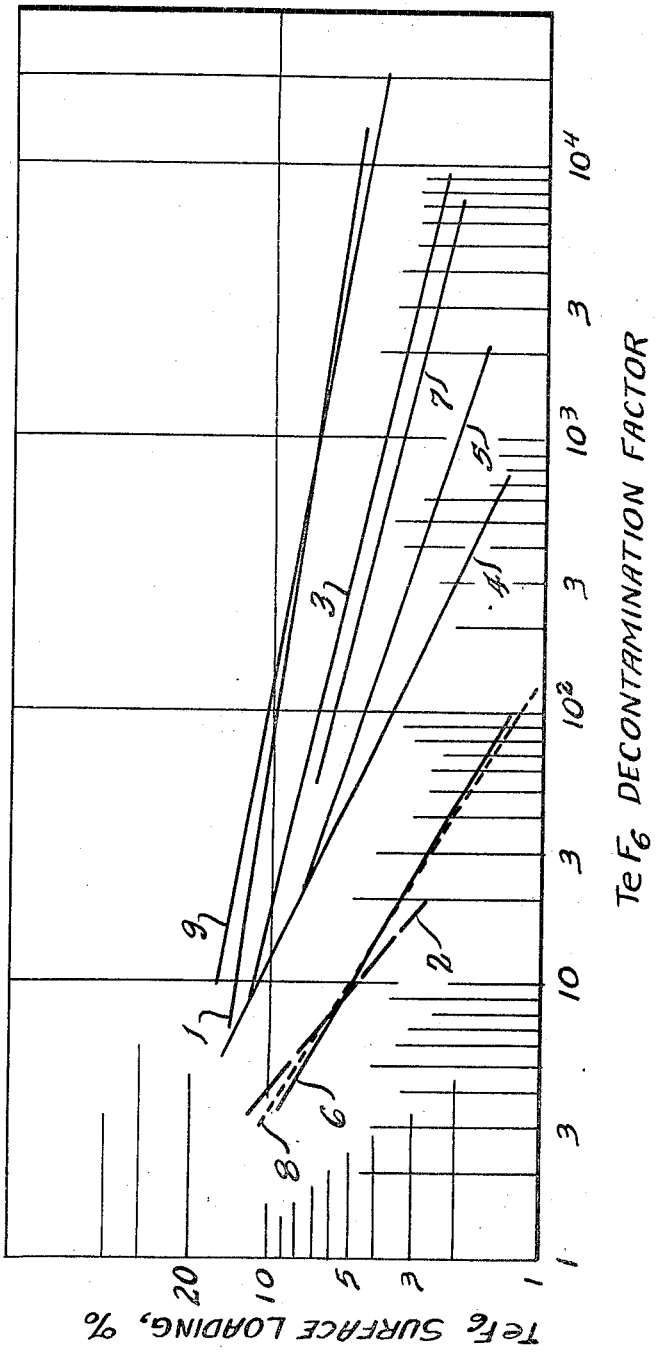
FIGURE 1 is a graph showing the effect of variations in bed height, gas velocity, temperature and tellurium hexafluoride concentration on tellurium hexafluoride surface loading and decontamination factor in a packed bed of activated alumina.

The results of the experiments showed a linear relationship between the logarithm of the DF and the logarithm of the percent loading, see FIGURE 1, in which each numbered line represents the corresponding experiment in Table I. By reference to FIGURE 1, the magnitude of the effects of each variable on the efficiency of tellurium hexafluoride removal by a packed bed of activated alumina can be calculated at any loading or at any DF. Two analyses of the effects of the variables are contained herein. The effect of the variables on the logarithm of the tellurium hexafluoride DF at 5% loading and the effects of the variables on the percent tellurium hexafluoride loading at 99.9% tellurium hexafluoride removal (DF=1,000) are reported in Table II.

TABLE II

| Increasing variables | Effect [1] on the $TeF_6$ loading at DF of 1,000 | Effect [2] on log DF at 5 percent loading |
|---|---|---|
| Temp., 25° C.–100° C | −0.22 | −0.09 |
| Gas flow velocity 20 to 40 ft./min | −1.44 | −0.68 |
| Bed height 1 in. to 2 in | +3.71 | +1.52 |
| $TeF_6$ conc. 250 p.p.m. to 500 p.p.m. | +1.54 | +0.74 |

[1] Values expressed in percent loading. Mean value of percent $TeF_6$ loading=2.34 at DF of 1,000.
[2] Values expressed in log DF. Mean value of log DF=1.9 6 at 5 percent loading.

Table II and the odd numbered runs in FIGURE 1 show that increasing the bed height from 1 to 2 inches had the greatest positive effect on surface loading, although increasing the tellurium hexafluoride concentration also had a positive effect. As may be expected increases in temperature and gas velocity had an adverse effect on the surface loading.

Air purge studies carried out to determine the stability of the sorbed tellurium hexafluoride on activated alumina indicated that the sorbed tellurium hexafluoride is stable towards dry air purges at flow rates of 20 to 40 feet per minute for all tellurium hexafluoride loadings investigated. These air purges were of 30 to 60 minute duration in runs 6, 7 and 8, see Table I. The distribution of tellurium hexafluoride in the packed bed was determined by radiation measurement and revealed that a tellurium hexafluoride concentration gradient developed in the 2-inch beds but not in the 1-inch beds.

It is believed that the adsorption of tellurium hexafluoride on activated alumina is diffusion controlled and that the bed height must be sufficient to provide enough residence time in the bed for all the tellurium hexafluoride present to diffuse into the pores of the activated alumina. It is also believed that the adsorption is a surface effect so that it is necessary for the last of the tellurium hexafluoride to contact clean activated alumina, hence the requirement for sufficient bed height to establish a concentration gradient of adsorbed tellurium hexafluoride.

Experiments were conducted to determine the fluorine removal characteristics for packed beds and fluidized beds of activated alumina. The adsorption characteristics of the packed and fluidized beds were measured as a function of the feed rate of fluorine in pounds of fluorine per hour and square feet of reactor cross section using activated alumina of 48 to 100 mesh and a concentration of 75 volume percent fluorine. The fluorine adsorption or removal rate in the fluidized beds was about 40 pounds per hour and square foot, while with packed beds of activated alumina the maximum adsorption was about 3 pounds per hour and square foot. Attempts to reach higher values for fluorine removal with the packed beds resulted in sintering of the beds and show that packed beds of activated alumina are not desirable for the removal of fluorine from gases containing large percentages of fluorine.

The reaction between activated alumina and fluorine is a chemical one which is exothermic and accounts for the sintering of the packed beds. A fluidized bed provides for greater heat transfer and a free flowing reaction product. But these reasons which make the fluidized bed applicable for fluorine removal render the fluidized bed unsuitable for tellurium hexafluoride removal. As stated above, it is believed that the adsorption of tellurium hexafluoride on activated alumina is diffusion controlled and is a surface effect. In a fluidized bed, all the tellurium hexafluoride may not contact clean activated alumina because of the inherent mixing of the bed, and the chance of tellurium hexafluoride escaping from a fluidized bed is greater than from a packed bed with sufficient bed height. Only by careful experimentation is it possible to determine which form of bed is suitable for each type of chemical compound sought to be trapped.

Figure 2:
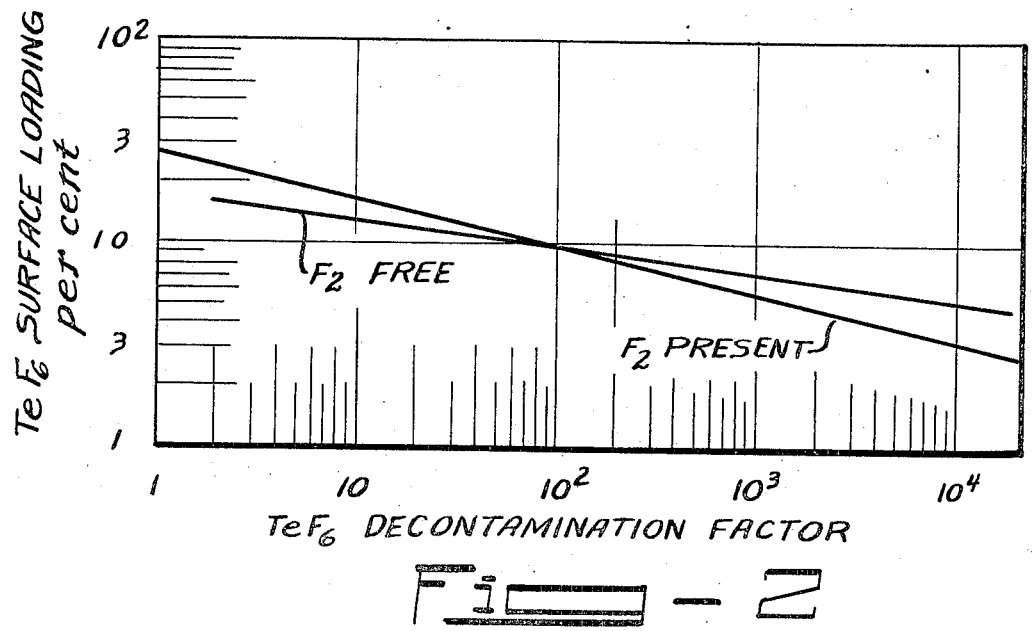
FIGURE 2 is a graph showing the effect of the presence of fluorine on tellurium hexafluoride surface loading and decontamination factor in a packed bed of activated alumina.

Experiments were conducted to determine what effect the presence of fluorine in the tellurium hexafluoride gas will have on a packed bed of activated alumina. Experiments were carried out under conditions which gave the best tellurium hexafluoride decontamination in the earlier reported experiments, that is at 25° C., a tellurium hexafluoride concentration of 500 p.p.m., a 2-inch bed of activated alumina and a gas flow rate of 20 feet per minute. The fluorine concentration was 500 p.p.m. FIGURE 2 shows the results obtained with fluorine present and without fluorine present. As may be seen from the figure, the higher the surface loading the more detrimental the presence of fluorine is to the tellurium hexafluoride DF.

Figure 3:
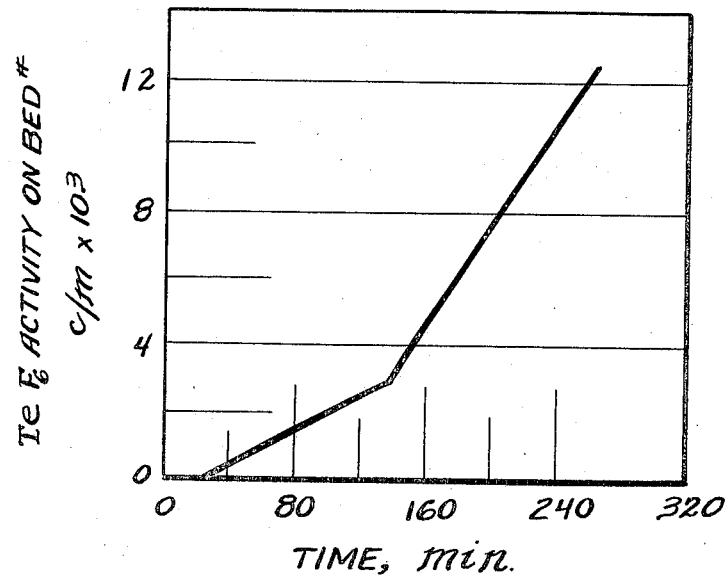
FIGURE 3 is a graph showing the displacement of surface loaded tellurium hexafluoride from activated alumina by fluorine.

The presence of fluorine in the tellurium hexafluoride containing gas may also cause displacement of previously sorbed tellurium hexafluoride from activated alumina. A 2-inch bed of activated alumina was surface loaded with approximately 13.8% radio-tagged tellurium hexafluoride. Under the experimental conditions used in Experiment 1, see Table I, the DF across the bed was 12.8. A second bed was placed in series with the first and an air-fluorine gas mixture at a flow rate of 20 feet per minute and fluorine concentration of 1000 p.p.m. was then passed into the first bed. The effluent exiting from the top of bed number 1 was adjusted to a tellurium hexafluoride concentration of 500 p.p.m. with nonradioactive tellurium hexafluoride. Removal of tellurium hexafluoride from the first bed was accompanied by a buildup of activity on the second bed as a function of time. The buildup of activity on the second bed, see FIGURE 3, clearly shows that fluorine displaces tellurium hexafluoride from activated alumina.

Bed height and fluorine content are the two most important factors in the removal of tellurium hexafluoride with activated alumina. As previously shown, the presence of a significant amount of fluorine in the gas will either prevent the adsorption of tellurium hexafluoride by activated alumina or cause the desorption of tellurium hexafluoride therefrom. Where fluorine is present in significant amounts it is necessary to utlize both fluidized beds and packed beds of activated alumina, and experiments have shown that a 6-inch packed bed of activated alumina in series with a fluidized bed of activated alumina can remove greater than 99.99% of the tellurium hexafluoride present in a gas stream containing both tellurium hexafluoride and fluorine.

Finally, it should be noted that tellurium hexafluoride may also be removed from a gas stream to some extent with activated charcoal or a molecular sieve, such as a sodium aluminum silicate having a high surface area. Because there is a possibility that potentially explosive products may be formed in a reaction between fluorine and charcoal, it is inapplicable to a process in which both tellurium hexafluoride and fluorine are present. While a molecular sieve does not form explosive products upon contact with fluorine, the sorption rate for tellurium hexafluoride is considered too slow. For these reasons activated alumina is the present choice for use in the fluoride volatility process.

The embodiments of the invention in which an exclusive property or privilege is claimed are defined as follows:

1. A method of removing a volatile tellurium compound from a gas containing said compound comprising passing said gas through a packed bed of activated alumina, said bed having sufficient bed height to establish a tellurium compound concentration gradient from the bottom to the top of the bed.

2. The method of claim 1 wherein the tellurium compound is tellurium hexafluoride.

3. The method of claim 1 wherein the gas is passed through the packed bed of activated alumina at a rate of about 20 feet per minute.

4. A method of removing tellurium hexafluoride from a gas containing fluorine and tellurium hexafluoride comprising establishing and maintaining a fluidized bed of activated alumina; passing said gas through the fluidized bed whereby most of the fluorine is removed therefrom; and passing the effluent from the fluidized bed through a packed bed of activated alumina, said packed bed having sufficient bed height to establish a tellurium concentration gradient from the bottom to the top of the bed.

5. The method of claim 4 wherein the packed bed is maintained at a temperature less than about 25° C. and the gas containing the tellurium hexafluoride passes through the packed bed at a rate of about 20 feet per minute.

References Cited

UNITED STATES PATENTS

| | | | |
|---|---|---|---|
| 3,165,376 | 1/1965 | Golliber | 55—71 X |
| 3,178,258 | 4/1965 | Cathers et al. | 55—71 X |
| 3,350,848 | 11/1967 | Brater et al. | 55—71 |
| 3,388,993 | 6/1968 | Peterson et al. | 55—71 X |

JAMES L. DECESARE, Primary Examiner